US012749614B2

(12) United States Patent
Zhang et al.

(10) Patent No.: US 12,749,614 B2
(45) Date of Patent: Sep. 29, 2026

(54) ELECTRICAL ELEMENT, CIRCUIT BOARD, AND SWITCHING POWER SUPPLY

(71) Applicant: HUAWEI TECHNOLOGIES CO., LTD., Shenzhen (CN)

(72) Inventors: Xijun Zhang, Dongguan (CN); Jia Li, Xi'an (CN); Jun Yao, Dongguan (CN); Chao Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 910 days.

(21) Appl. No.: 18/145,311

(22) Filed: Dec. 22, 2022

(65) Prior Publication Data

US 2023/0125476 A1 Apr. 27, 2023

Related U.S. Application Data

(63) Continuation of application No. PCT/CN2020/098188, filed on Jun. 24, 2020.

(51) Int. Cl.
*H01F 27/30* (2006.01)
*H01F 27/24* (2006.01)
*H01F 27/28* (2006.01)

(52) U.S. Cl.
CPC ........... *H01F 27/306* (2013.01); *H01F 27/24* (2013.01); *H01F 27/2804* (2013.01)

(58) Field of Classification Search
CPC .................................................. H01F 27/2804
USPC ................ 336/133–134, 165, 205–206, 212, 336/215–216
See application file for complete search history.

(56) References Cited

U.S. PATENT DOCUMENTS 2,333,995 A * 11/1943 Gaynor .................. H01F 41/02 336/212
8,035,472 B2 * 10/2011 Vail .................... H01F 41/0246 336/212
2004/0085174 A1 5/2004 Decristofaro et al.

FOREIGN PATENT DOCUMENTS

| | | | |
|---|---|---|---|
| CN | 103258624 | A | 8/2013 |
| CN | 205194476 | U | 4/2016 |
| CN | 207909617 | U | 9/2018 |
| JP | H04206509 | A | 7/1992 |
| WO | 2008104636 | A1 | 9/2008 |
| WO | 2010057350 | A1 | 5/2010 |
| WO | 2018158339 | A1 | 9/2018 |
| WO | 2020090577 | A1 | 5/2020 |

(Continued)

*Primary Examiner* — Ronald Hinson
(74) *Attorney, Agent, or Firm* — WOMBLE BOND DICKINSON (US) LLP

(57) ABSTRACT

This application provides an electrical element, a circuit board, and a switching power supply. The electrical element includes a first magnetic core and a second magnetic core disposed opposite to each other. The first magnetic core and the second magnetic core enclose space for accommodating a winding. The first magnetic core and the second magnetic core are further configured to bind a magnetic induction wire. The electrical element further includes a third magnetic core located in the space enclosed by the first magnetic core and the second magnetic core. The third magnetic core is configured to wind the winding. The third magnetic core is fixedly connected to the first magnetic core and the second magnetic core. An air gap is disposed in at least one of the first magnetic core and/or the second magnetic core.

9 Claims, 5 Drawing Sheets

(56) References Cited

FOREIGN PATENT DOCUMENTS

| | | | |
|---|---|---|---|
| WO | 2020170783 | A1 | 8/2020 |

* cited by examiner

ELECTRICAL ELEMENT, CIRCUIT BOARD, AND SWITCHING POWER SUPPLY

CROSS-REFERENCE TO RELATED APPLICATIONS

This application is a continuation of International Application No. PCT/CN2020/098188, filed on Jun. 24, 2020, the disclosure of which is hereby incorporated by reference in its entirety.

TECHNICAL FIELD

This application relates to the field of electrical technologies, and in particular, to an electrical element, a circuit board, and a switching power supply.

BACKGROUND

A switching power supply is also referred to as a switching power supply and a switching converter, and is a high-frequency power conversion apparatus and a power supply unit. A function of the switching power supply is to convert, by using different forms of architectures, a type of input voltage into a voltage or a current required by a user terminal. For the switching power supply, most inputs are alternating current power supplies (for example, mains power) or direct current power supplies, and most outputs are devices that need a direct current power supply. The switching power supply is widely applied to various fields.

In recent years, people make requirements of environmental friendliness, high efficiency, and safety on energy, and expect to obtain a switching power supply with lower costs and a smaller size. Therefore, the switching power supply inevitably develops toward high efficiency and high density. With the development of miniaturization of the switching power supply, there is inevitably an increasingly small magnetic element in the switching power supply. In addition, as there is increasingly high switching frequency for the switching power supply, the magnetic element needs to have higher efficiency in addition to an increasingly small size. Under such conditions, it is particularly important to optimize a loss caused due to stray flux at an air gap in magnetic core design. However, a current commonly used manner of using a segmented air gap is inapplicable to a high-density and high-efficiency scenario.

SUMMARY

This application provides an electrical element, a circuit board, and a switching power supply, to improve the circuit board, so as to meet a high-density wiring requirement.

According to a first aspect, an electrical element is provided. The electrical element is applied to a circuit board. The electrical element includes a first magnetic core and a second magnetic core disposed opposite to each other. The first magnetic core and the second magnetic core enclose space for accommodating a winding. In addition, the first magnetic core and the second magnetic core are further configured to bind a magnetic induction wire, so that more magnetic induction wires flow in the first magnetic core and the second magnetic core. The electrical element further includes a third magnetic core disposed in the space enclosed by the first magnetic core and the second magnetic core. The third magnetic core is configured to wind the winding. During assembly, the third magnetic core is fixedly connected to the first magnetic core and the second magnetic core, and an air gap is disposed in at least one of the first magnetic core and/or the second magnetic core. In the technical solution, the air gap is disposed in the first magnetic core or the second magnetic core, and there is no air gap in the third magnetic core, and therefore there is no stray flux, and more generated magnetic induction lines are bound in the first magnetic core and the second magnetic core. In this way, occurrence of an additional cutting loss is reduced, a case in which the magnetic core and the winding need to be avoided in high-density design is resolved, and wiring density on the circuit board is increased, so that the circuit board is applicable to a high-density and high-efficiency wiring scenario.

In an embodiment, the air gap is disposed in a plurality of manners. For example, the air gap may be disposed only in the first magnetic core or the second magnetic core. Alternatively, there are two air gaps, and the two air gaps are respectively disposed in the first magnetic core and the second magnetic core. The air gap is disposed in different manners.

In an embodiment, a groove for accommodating an end portion of the third magnetic core is disposed in at least one of the first magnetic core and the second magnetic core, and the air gap is formed between each groove and the inserted end portion of the third magnetic core. The groove is disposed in the first magnetic core and/or the second magnetic core, and the air gap is formed between the groove and the third magnetic core.

In an embodiment, the air gap is an insulation layer, and the end portion of the third magnetic core is fixedly connected to the corresponding groove by using the insulation layer. The insulation layer is used as the air gap, to facilitate connection between magnetic cores and facilitate formation of the air gap.

In an embodiment, the insulation layer may be made of different materials. For example, the insulation layer may be an epoxy resin layer or an adhesive layer.

In an embodiment, a thickness of the insulation layer is less than a depth of the corresponding groove. In this way, a spacing between the third magnetic core and another magnetic core is reduced, to further help the magnetic induction line enter the first magnetic core or the second magnetic core.

In an embodiment, an opening area of each groove is greater than an end face area of the corresponding inserted end portion of the third magnetic core. In this way, a case in which the air gap is short-circuited due to an excessively short distance between the third magnetic core and another magnetic core is avoided, to further help the magnetic induction line enter the first magnetic core or the second magnetic core.

In an embodiment, there is a gap between each sidewall of each groove and an opposite sidewall of the third magnetic core. In this way, a case in which the air gap is short-circuited due to an excessively short distance between the third magnetic core and another magnetic core is avoided, to further help the magnetic induction line enter the first magnetic core or the second magnetic core.

In an embodiment, the thickness of the insulation layer is less than the gap between each sidewall of each groove and the opposite sidewall of the third magnetic core, to ensure that the air gap is at a bottom.

In an embodiment, there is one third magnetic core, the third magnetic core and the first magnetic core are of an integral structure, and the air gap is disposed in the second magnetic core. A manner of disposing one air gap is provided.

In an embodiment, the first magnetic core and the third magnetic core form an E-shaped magnetic core, and the second magnetic core is of a plate-like structure, to facilitate connection between magnetic cores.

In an embodiment, there are two third magnetic cores, each of the first magnetic core and the second magnetic core is a C-shaped magnetic core, one of the third magnetic cores (e.g., a fourth magnetic core) is fixedly connected to the first magnetic core, the other third magnetic core (e.g., a fifth magnetic core) is fixedly connected to the second magnetic core, and the air gap is disposed in each of the first magnetic core and the second magnetic core. A manner of disposing two air gaps is provided.

In an embodiment, the two air gaps have a same size.

According to a second aspect, a circuit board is provided. The circuit board includes a wiring layer and the electrical element in any one of the first aspect and the implementable solutions. A circuit of the wiring layer is spaced from the electrical element by a specified distance. In the technical solution, an air gap is disposed in a first magnetic core or a second magnetic core, and there is no air gap in a third magnetic core, and therefore there is no stray flux, and more generated magnetic induction lines are bound in the first magnetic core and the second magnetic core. In this way, occurrence of an additional cutting loss is reduced, a case in which the magnetic core and a winding need to be avoided in high-density design is resolved, and wiring density on the circuit board is increased, so that the circuit board is applicable to a high-density and high-efficiency wiring scenario.

According to a third aspect, a switching power supply is provided. The switching power supply includes a housing and the foregoing circuit board or the electrical element in any one of the first aspect and the embodiments that is disposed in the housing. In the technical solution, an air gap is disposed in a first magnetic core or a second magnetic core, and there is no air gap in a third magnetic core, and therefore there is no stray flux, and more generated magnetic induction lines are bound in the first magnetic core and the second magnetic core. In this way, occurrence of an additional cutting loss is reduced, a case in which the magnetic core and a winding need to be avoided in high-density design is resolved, and wiring density on the circuit board is increased, so that the circuit board is applicable to a high-density and high-efficiency wiring scenario.

DESCRIPTION OF EMBODIMENTS

Figure 1:
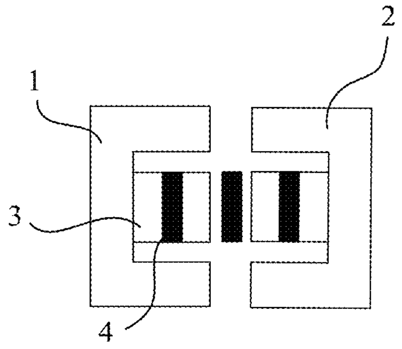
FIG. 1 is a schematic exploded view of an electrical element in the conventional technology.

For ease of understanding, an application scenario of an electrical element provided in the embodiments of this application is first described. As a planar magnetic element, the electrical element provided in the embodiments of this application may be applied to a circuit board, but is not limited to being applied to a circuit board. A circuit board is used as an example. The circuit board to which the electrical element is applied may be a different circuit board, for example, a common circuit board such as a circuit board in a communications device or a circuit board in a self-driving vehicle. A high-density and high-efficiency wiring manner is usually used for the circuit board. However, due to magnetic flux leakage, an existing electrical element needs to be spaced from another wire by a specific distance, to ensure a working effect of the circuit board. This affects wiring density on the circuit board. FIG. 1 is a schematic diagram of a structure of an electrical element in the conventional technology. The electrical element includes a first magnetic core 1 and a second magnetic core 2 that fits with the first magnetic core 1. The first magnetic core 1 and the second magnetic core 2 enclose space for accommodating a winding. A third magnetic core 3 is disposed between the first magnetic core 1 and the second magnetic core 2. The third magnetic core 3 is of a segmented structure, and an air gap 4 is disposed between two adjacent segments of magnetic cores. When the third magnetic core 3 is segmented, the air gap is also segmented. There is likely to be leakage flux when the segmented air gap is used. Therefore, the embodiments of this application provide an electrical element. The electrical element is described below with reference to specific accompanying drawings and embodiments.

The terms "first", "second", and the like in the specification and claims of this application are used to distinguish between similar structures, and do not represent a specific order or sequence.

The electrical element provided in the embodiments of this application includes but is not limited to a magnetic element such as an inductor or a transformer.

Figure 2:
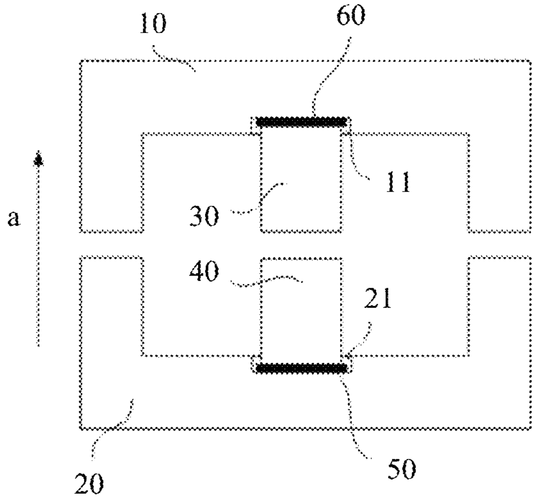
FIG. 2 is a schematic exploded view of an electrical element according to an embodiment of this application.

FIG. 2 is a schematic exploded view of an electrical element according to an embodiment of this application. For ease of description, a reference direction a is introduced, and the direction a is parallel to an axis around which a winding is wound. The electrical element includes magnetic cores and the winding (not shown in the figure). The magnetic core is configured to support the winding, and the winding is wound around the magnetic core. A common winding manner may be used as a winding manner of the winding. This is not specifically limited in this application.

The magnetic cores include a first magnetic core 10 and a second magnetic core 20. The first magnetic core 10 and the second magnetic core 20 are stacked in the direction a. The first magnetic core 10 and the second magnetic core 20 are disposed opposite to each other, and enclose space for accommodating the winding. In addition, the first magnetic core 10 and the second magnetic core 20 are further configured to bind a magnetic induction wire, so that more magnetic induction wires flow in the first magnetic core 10 and the second magnetic core 20.

The first magnetic core 10 is a C-shaped magnetic core, and there is a first groove 11 in the first magnetic core 10. A first insulation layer 60 is disposed in the first groove 11, and the first insulation layer 60 may be used as a solid air gap.

The second magnetic core 20 is a C-shaped magnetic core, and an opening direction of the second magnetic core 20 is opposite to an opening direction of the first magnetic core 10. There is a second groove 21 in the second magnetic core 20. A second insulation layer 50 is disposed in the second groove 21, and the second insulation layer 50 may be used as a solid air gap.

When the first magnetic core 10 and the second magnetic core 20 are disposed opposite to each other, the first groove 11 and the second groove 21 are disposed opposite to each other, and the first insulation layer 60 and the second insulation layer 50 are disposed opposite to each other.

In an embodiment, axes of the first groove 11, the second groove 21, the first insulation layer 60, and the second insulation layer 50 are a same axis. Axes of the first magnetic core 10 and the second magnetic core 20 may be a same axis as axes of components such as the first groove 11 and the second groove 21.

The magnetic cores further include a third magnetic core, and there are two third magnetic cores: a third magnetic core 30 (also referred to as a fourth magnetic core) and a third magnetic core 40 (also referred to as a fifth magnetic core). The third magnetic core 30 and the third magnetic core 40 are configured to wind the winding. A specific winding manner is not described in detail herein. The third magnetic core 30 and the third magnetic core 40 are located between the first magnetic core 10 and the second magnetic core 20. When the first magnetic core 10 and the second magnetic core 20 are fastened, the third magnetic core 30 and the fourth magnetic core 40 form a complete inner magnetic core.

In an embodiment, the third magnetic core 30 and the third magnetic core 40 may be cylindrical magnetic cores. However, this is not limited thereto.

The third magnetic core 30 is fixedly connected to the first magnetic core 10, and the third magnetic core 40 is fixedly connected to the second magnetic core 20. For example, an end portion of the third magnetic core 30 is fixedly connected to the first insulation layer 60, and an end portion of the third magnetic core 40 is fixedly connected to the second insulation layer 50.

For example, a manner of fixedly connecting any two of the first magnetic core 10, the first insulation layer 60, and the third magnetic core 30 includes but is not limited to a common connection manner such as bonding or welding. A manner of fixedly connecting any two of the second magnetic core 20, the second insulation layer 50, and the third magnetic core 40 includes but is not limited to a common connection manner such as bonding or welding.

The winding is wound around the third magnetic core 30 and the fourth magnetic core 40. The winding may be made of a multi-strand wire or an excitation wire, or may be a printed circuit board (PCB) winding or the like. Certainly, this is not limited to thereto.

Figure 3:
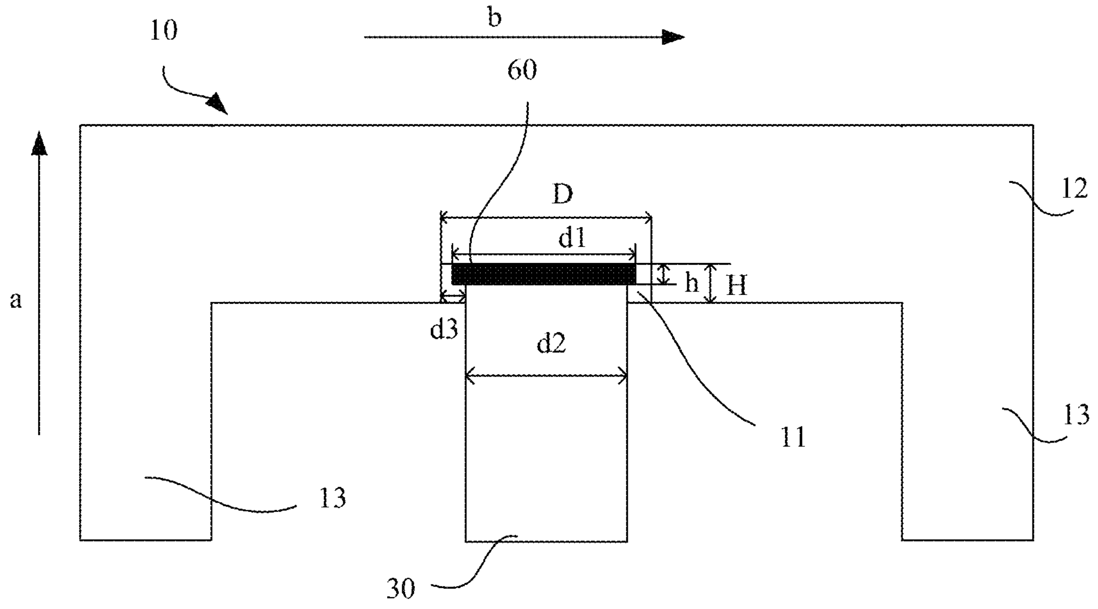
FIG. 3 is a schematic diagram of a structure of a first magnetic core in an electrical element according to an embodiment of this application.

FIG. 3 is a schematic diagram of a structure of the first magnetic core. The first magnetic core 10 includes a first plate-like structure 12 and two first sidewalls 13 connected to the first plate-like structure 12. The two first sidewalls 13 are disposed opposite to each other, and jointly form, with the first plate-like structure 12, space for accommodating the winding. The first groove 11 in the first magnetic core 10 is disposed in the first plate-like structure 12. The first insulation layer 60 in the first groove 11 may be used as a solid air gap. In an example, a material of the first insulation layer 60 includes but is not limited to an epoxy resin layer, an adhesive layer, or an epoxy plate.

Although the first magnetic core 10 is divided into the first plate-like structure 12 and the two first sidewalls 13, the division is merely division made to help describe the structure of the first magnetic core 10, and does not represent an actual structure of the first magnetic core 10. The first plate-like structure 12 and the two first sidewalls 13 may be of an integral structure.

In an embodiment, an opening shape of the first groove 11 matches an end face shape of the third magnetic core 30. For example, the opening shape of the first groove 11 includes but is not limited to a round shape, an elliptic shape, a rectangular shape, or an abnormal shape.

In an embodiment, the first groove 11, the first insulation layer 60, and the third magnetic core 30 meet the following formula: $D \geq d1 > d2$, where D1 is a dimension of the first groove 11 in a direction b, d1 is a dimension of the first insulation layer 60 in the direction b, and d3 is a dimension of the first magnetic core 10 in the direction b. The direction b is perpendicular to the direction a. In FIG. 3, although dimensions of the first groove 11, the first insulation layer 60, and the third magnetic core 30 only in the direction b are shown, dimensions of the first groove 11, the first insulation layer 60, and the third magnetic core 30 in another direction that is perpendicular to the direction a and that is on a same plane as the direction b meet the formula.

It may be learned from the foregoing description that an opening area of the first groove 11 is greater than an end face area of the corresponding inserted end portion of the third magnetic core 30. In this way, a case in which the air gap is short-circuited due to an excessively short distance between the third magnetic core 30 and another magnetic core (the first magnetic core 10) is avoided, to further help the magnetic induction line enter the first magnetic core 10. For example, there is a gap between each sidewall of the first groove 11 and an opposite sidewall of the third magnetic core 30, to increase a spacing between the third magnetic core 30 and the first magnetic core 10. In this way, a case in which the air gap is short-circuited is avoided, to further help the magnetic induction line enter the first magnetic core 10. When the opening shape of the first groove 11 is a round shape, each sidewall of the first groove 11 is an inner sidewall of the first groove 11.

When the first groove 11, the first insulation layer 60, and the third magnetic core 30 are coaxially disposed, the gap between the first groove 11 and the third magnetic core 30 is an annular gap of an equal width, and a width of the annular gap in the direction b is d3.

In an embodiment of this application, the dimensions of the first insulation layer 60 and the first groove 11 are not specifically limited. A manner in which $d1=D$ may be used, that is, an outer edge of the first insulation layer 60 fits with an inner edge of the first groove 11. Alternatively, a manner in which $d1<D$ may be used, that is, there is a gap between an outer edge of the first insulation layer 60 and an inner edge of the first groove 11.

A depth of the first groove 11 in the direction a is H, and a thickness of the first insulation layer 60 in the direction a is h. When the first insulation layer 60 and the first groove 11 are disposed, $H \geq h$ or $H<h$ may be selected.

In an embodiment, the first groove 11 and the first insulation layer 60 meet the following formula: $H>h$, so that the end portion of the third magnetic core 30 may be partially inserted into the first groove 11. A depth at which the third magnetic core 30 is inserted into the first groove 11 is H−h. The depth at which the third magnetic core 30 is inserted into the first groove 11 may be determined based on the dimension of the first insulation layer 60. For example, when there needs to be a relatively large air gap, the first insulation layer 60 has a relatively large thickness, and there is a relatively small depth at which the third magnetic core 30 is inserted.

When the winding is wound around the third magnetic core 30, the end portion (a dimension of the end portion is H−h) that is of the third magnetic core 30 and that is inserted into the first groove 11 does not wind the winding, and only a part that is of the third magnetic core 30 and that is exposed outside the first groove 11 winds the winding. The first groove 11 is used to accommodate only the first insulation layer 60 to form an air gap, and is not used to accommodate the winding.

In an embodiment, h<d3, that is, the thickness of the first insulation layer 60 in the direction a is less than the gap between the sidewall of the first groove 11 and the opposite sidewall of the third magnetic core 30, so that the formed air gap is located between bottom surfaces of the third magnetic core 30 and the first groove 11.

Figure 4:
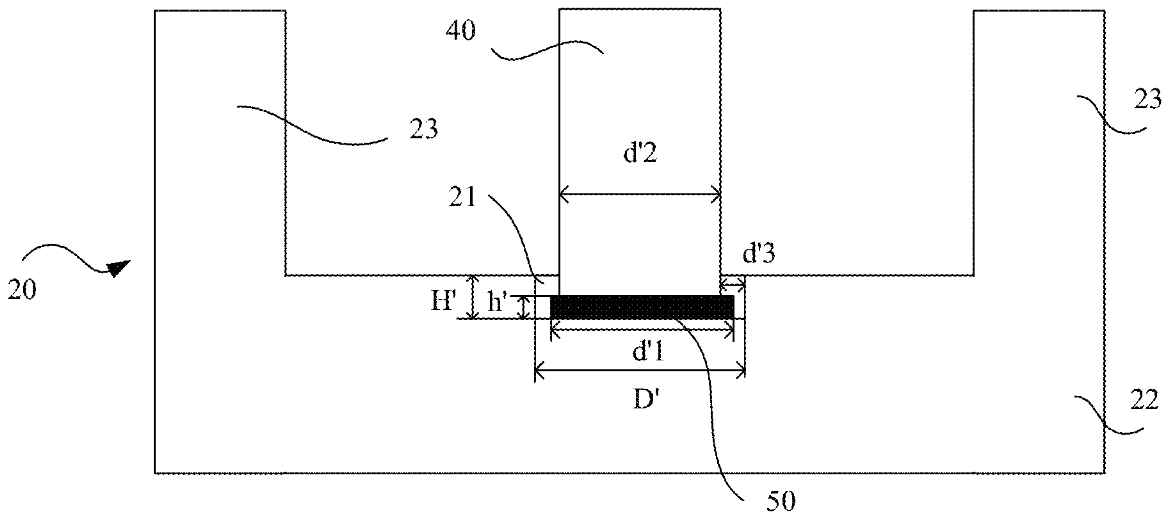
FIG. 4 is a schematic diagram of a structure of a second magnetic core in an electrical element according to an embodiment of this application.

FIG. 4 is a schematic diagram of a structure of the second magnetic core. The second magnetic core 20 includes a second plate-like structure 22 and two second sidewalls 23 connected to the second plate-like structure 22. The two second sidewalls 23 are disposed opposite to each other, and enclose, with the second plate-like structure 22, space for accommodating the winding. The second groove 21 in the second magnetic core 20 is disposed in the second plate-like structure 22. The second insulation layer 50 in the second groove 21 is used as a solid air gap. In an example, a material of the second insulation layer 50 includes but is not limited to an epoxy resin layer, an adhesive layer, or an epoxy plate.

Although the second magnetic core 20 is divided into the second plate-like structure 22 and the two second sidewalls 23, the division is merely division that is made on the second magnetic core 20 and that is used to help describe the structure of the second magnetic core 20, and does not represent an actual structure of the second magnetic core 20. The second plate-like structure 22 and the two second sidewalls 23 may be of an integral structure.

An opening shape of the second groove 21 needs to match only an end face shape of the third magnetic core 40. For example, the opening shape of the second groove 21 includes but is not limited to a round shape, an elliptic shape, a rectangular shape, or an abnormal shape.

In an embodiment, the second groove 21, the second insulation layer 50, and the third magnetic core 40 meet the following formula: D'≥d'1>d'2, where D'1 is a dimension of the second groove 21 in a direction b, d'1 is a dimension of the second insulation layer 50 in the direction b, and d'3 is a dimension of the second magnetic core 20 in the direction b. The direction b is perpendicular to the direction a. In FIG. 4, although dimensions of the second groove 21, the second insulation layer 50, and the third magnetic core 40 only in the direction b are shown, dimensions of the second groove 21, the second insulation layer 50, and the third magnetic core 40 in another direction that is perpendicular to the direction a and that is on a same plane as the direction b meet the formula.

It may be learned from the formula that an opening area of the second groove 21 is greater than an end face area of the inserted end portion of the third magnetic core 40. In this way, a case in which the air gap is short-circuited due to an excessively short distance between the third magnetic core 40 and another magnetic core (the second magnetic core 20) is avoided, to further help the magnetic induction line enter the second magnetic core 20. For example, there is a gap between each sidewall of the second groove 21 and an opposite sidewall of the third magnetic core 40, to increase a spacing between the third magnetic core 40 and the second magnetic core 20. In this way, a case in which the air gap is short-circuited is avoided, to further help the magnetic induction line enter the second magnetic core 20. When the opening shape of the second groove 21, a shape of the second insulation layer 50, and an end face of the third magnetic core 40 are round shapes, each sidewall of the second groove 21 is an inner sidewall of the second groove 21.

When the second groove 21, the second insulation layer 50, and the third magnetic core 40 are coaxially disposed, the gap between the second groove 21 and the third magnetic core 40 is an annular gap of an equal width, and a width of the annular gap in the direction b is d'3.

In an embodiment of this application, the dimensions of the second insulation layer 50 and the second groove 21 are not specifically limited. A manner in which d'1=D' may be used, that is, an outer edge of the second insulation layer 50 fits with an inner edge of the second groove 21. Alternatively, a manner in which d'1<D' may be used, that is, there is a gap between an outer edge of the second insulation layer 50 and an inner edge of the second groove 21.

A depth of the second groove 21 in the direction a is H', and a thickness of the second insulation layer 50 in the direction a is h'. When the second insulation layer 50 and the second groove 21 are disposed, H'≥h' or H'<h' may be selected.

In an embodiment, the second groove 21 and the second insulation layer 50 meet the following formula: H'>h', so that the third magnetic core 40 may be partially inserted into the second groove 21. A depth at which the third magnetic core 40 is inserted into the second groove 21 is H'−h'. The depth at which the third magnetic core 40 is inserted into the second groove 21 may be determined based on the dimension of the second insulation layer 50. For example, when there needs to be a relatively large air gap, the second insulation layer 50 has a relatively large thickness, and there is a relatively small depth at which the third magnetic core 40 is inserted.

When the winding is wound around the third magnetic core 40, the end portion (a dimension of the end portion is H'−h') that is of the third magnetic core 40 and that is inserted into the second groove 21 does not wind the winding, and only a part that is of the third magnetic core 40 and that is exposed outside the second groove 21 winds the winding. The second groove 21 is used to accommodate only the second insulation layer 50 to form an air gap, and is not used to accommodate the winding.

In an embodiment, H'<d'3, that is, the thickness of the second insulation layer 50 in the direction a is less than the gap between the sidewall of the second groove 21 and the opposite sidewall of the third magnetic core 40, so that the formed air gap is located between bottom surfaces of the third magnetic core 40 and the second groove 21.

In an embodiment, the air gap is disposed in the first magnetic core 10 or the second magnetic core 20, and there is no air gap in the third magnetic core 40, and therefore there is no stray flux, and more generated magnetic induction lines are bound in the first magnetic core 10 and the second magnetic core 20. In this way, occurrence of an additional cutting loss caused due to generated leakage flux is reduced, a case in which the winding needs to be avoided in high-density design is resolved, and wiring density on a circuit board is increased, so that the circuit board is applicable to a high-density and high-efficiency wiring scenario.

Reference is made to both the first magnetic core 10 and the second magnetic core 20 shown in FIG. 3 and FIG. 4. When two air gaps are disposed, the two air gaps may have a same size. In other words, the air gap in the first magnetic core 10 and the air gap in the second magnetic core 20 are equal in size, and are axially symmetrically disposed. It should be understood that the foregoing description is merely an example of a specific manner of disposing the air gap. In an embodiment of this application, a manner in which the two air gaps differ in size may be used. For example, the air gap in the first magnetic core 10 is larger than the air gap in the second magnetic core 20, or the air gap in the first magnetic core 10 is smaller than the air gap in the second magnetic core 20.

Figure 5:
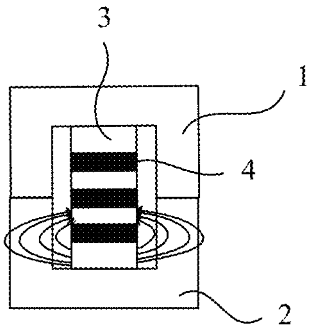
FIG. 5 is a schematic diagram of magnetic flux leakage of an electrical element in the conventional technology.
Figure 6:
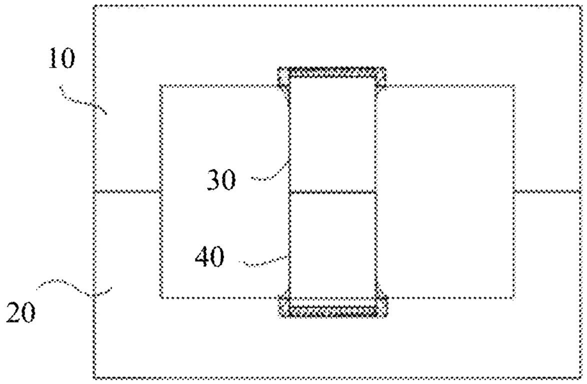
FIG. 6 is a schematic diagram of a direction of a magnetic induction line of an electrical element on two sides of an air gap according to an embodiment of this application.

For ease of understanding, a diagram of effect comparison between the electrical element provided in the embodiments of this application and an existing electrical element is provided. FIG. 5 and FIG. 6 are schematic diagrams of magnetic induction lines of two different electrical elements. FIG. 5 is a schematic diagram of distribution of magnetic induction lines existing when a segmented air gap is used in the conventional technology. For reference numerals of components in FIG. 5, refer to the same reference numerals in FIG. 2. It may be learned from FIG. 5 that on two sides of the air gap, the magnetic induction line (a curve with an arrow) points from a magnetic core on one side of the air gap to a magnetic core on the other side of the air gap, and there is leakage flux in the air. When wiring is performed on a circuit board, a region in which there is magnetic flux leakage needs to be avoided, to avoid impact of the electrical element. It may be learned from FIG. 6 that an air gap is disposed in a first magnetic core 10 and a second magnetic core 20 located at end portions, magnetic induction lines (curves with an arrow) directly point from third magnetic cores 30 and 40 to the first magnetic core 10 and the second magnetic core 20, and the magnetic induction lines are bound in the first magnetic core 10 and the second magnetic core 20, to reduce occurrence of leakage flux. When wiring is performed on a circuit board, a wire may be close to the circuit board, to implement denser wiring density on the circuit board, so that the circuit board is applicable to a high-density and high-efficiency wiring scenario.

Figure 7:
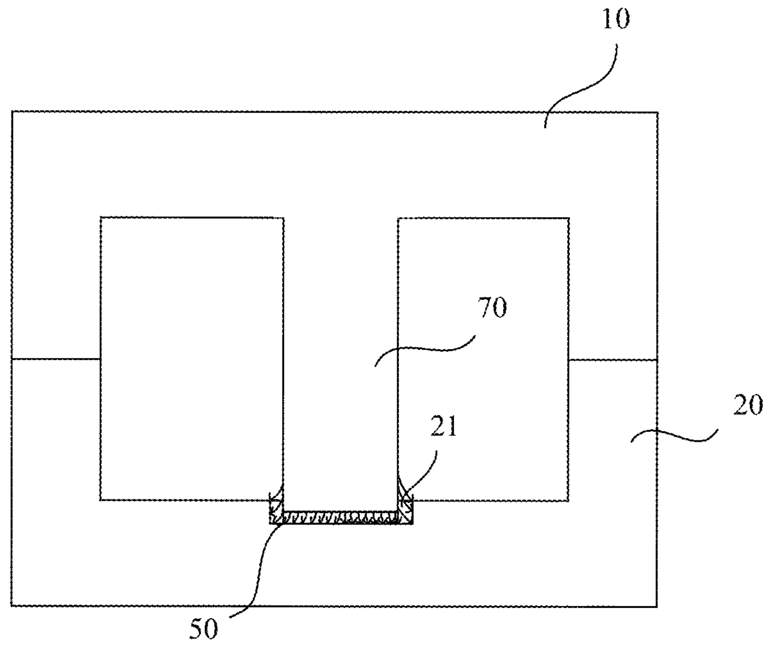
FIG. 7 is a schematic diagram of a structure of another electrical element according to an embodiment of this application.

FIG. 7 is a schematic diagram of a structure of another electrical element according to an embodiment of this application. FIG. 7 is a variant of the electrical element shown in FIG. 2. For some reference numerals in FIG. 7, refer to the description of the same reference numerals in FIG. 2.

A third magnetic core 70 and a first magnetic core 10 in the electrical element are of an integral structure to form an E-shaped magnetic core. A second magnetic core 20 is of a C-shaped structure. The third magnetic core 70 and the second magnetic core 20 are fixedly connected by using a second insulation layer 50. In this case, there is only one air gap in the electrical element, and the air gap is located in the second magnetic core 20.

The second insulation layer 50 is disposed in a second groove 21 in the second magnetic core 20. For a specific disposing manner and a manner of connection to the third magnetic core 70, refer to the related description in FIG. 4.

Similarly, a third magnetic core and a second magnetic core may be of an integral structure to form an E-shaped magnetic core. A first magnetic core is of a C-shaped structure. The third magnetic core and the first magnetic core are fixedly connected by using a first insulation layer. In this case, there is only one air gap in the electrical element, and the air gap is located in the first magnetic core. For a specific manner of disposing the first insulation layer, refer to the related description in FIG. 3.

Figure 8:
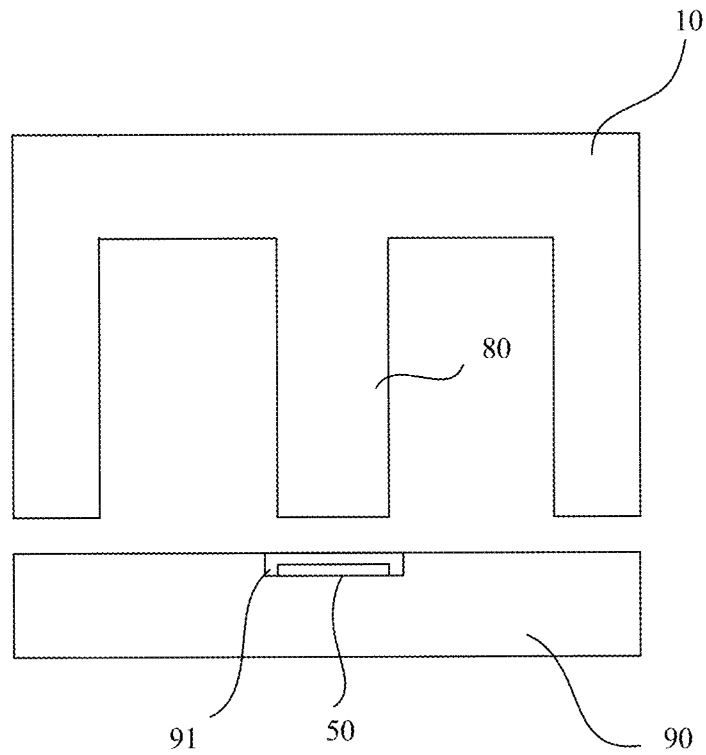
FIG. 8 is a schematic diagram of a structure of another electrical element according to an embodiment of this application.

FIG. 8 is a schematic diagram of a structure of a third electrical element according to an embodiment of this application. FIG. 8 is a variant of the electrical element shown in FIG. 2. For some reference numerals in FIG. 8, refer to the description of the same reference numerals in FIG. 2.

In the electrical element shown in FIG. 8, there is one third magnetic core 80, the third magnetic core 80 and a first magnetic core 10 are of an integral structure, the first magnetic core 10 and the third magnetic core 80 form an E-shaped magnetic core, and a second magnetic core 90 is of a plate-like structure.

An air gap is disposed in the second magnetic core 90. The second magnetic core 90 is of a plate-like structure, and a second groove 91 for accommodating an end portion of the third magnetic core 80 and a second insulation layer 50 disposed in the second groove 91 are disposed in the second magnetic core 90. The second insulation layer 50 is used as a solid air gap. For fitting of the second groove 91, the second insulation layer 50, and the third magnetic core 80, refer to the related description in FIG. 4.

Figure 9:
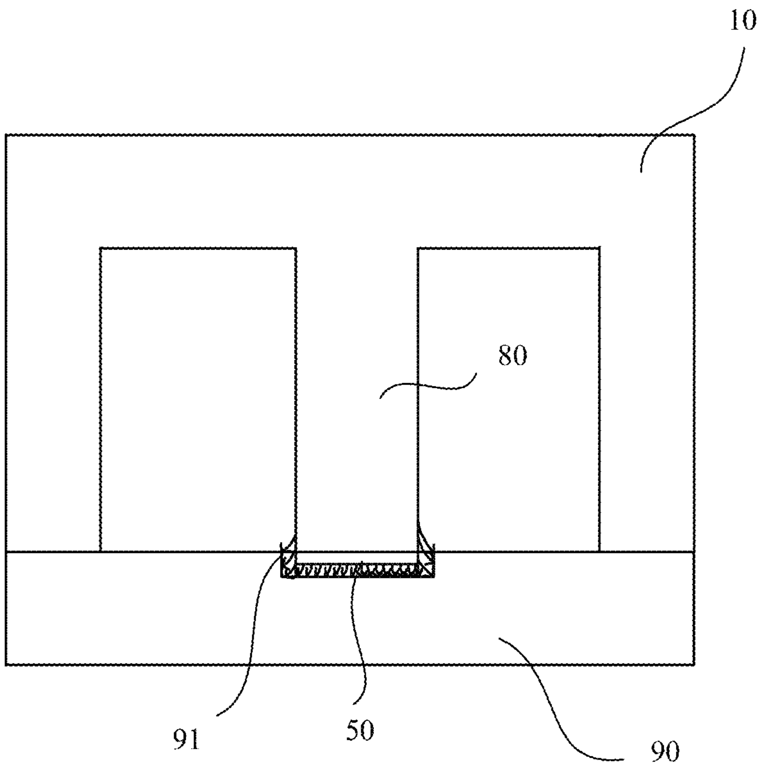
FIG. 9 is a schematic diagram of a direction of a magnetic induction line of an electrical element on two sides of an air gap according to an embodiment of this application.

For ease of understanding, a diagram of effect comparison between the electrical element provided in the embodiments of this application and an existing electrical element is provided. FIG. 5 and FIG. 9 are schematic diagrams of magnetic induction lines of two different electrical elements. FIG. 5 is a schematic diagram of distribution of magnetic induction lines existing when a segmented air gap is used in the conventional technology. For reference numerals of components in FIG. 5, refer to the same reference numerals in FIG. 2. It may be learned from FIG. 5 that on two sides of the air gap, the magnetic induction line (a curve with an arrow) points from a magnetic core on one side of the air gap to a magnetic core on the other side of the magnetic core, and there is leakage flux in the air. When wiring is performed on a circuit board, a region in which there is magnetic flux leakage needs to be avoided, to avoid impact of the electrical element. For some reference numerals in FIG. 9, refer to the same reference numerals in FIG. 8. It may be learned from FIG. 9 that an air gap is disposed in a second magnetic core 90 located at an end portion, the magnetic induction line directly points from a third magnetic core 70 to the second magnetic core 90, and the magnetic induction line is bound in a first magnetic core 10 and the second magnetic core 90, to reduce occurrence of leakage flux. When wiring is performed on a circuit board, a wire may be close to the circuit board, to implement denser wiring density on the circuit board, so that the circuit board is applicable to a high-density and high-efficiency wiring scenario.

With reference to the three specific electrical elements shown in FIG. 2, FIG. 7, and FIG. 8, it may be learned that the electrical element provided in the embodiments of this application is manufactured in a manner in which there is an air gap between a third magnetic core and at least one of a first magnetic core and a second magnetic core, and the air gap is located in the first magnetic core and/or the second magnetic core, to effectively alleviate a case of leakage flux. When the electrical element is disposed on a circuit board, a wiring layer may be closer to the electrical element, to increase wiring density on the circuit board.

In the embodiments of this application, a specific quantity of air gaps is not limited. The air gap may be disposed only in the first magnetic core or the second magnetic core, as shown in FIG. 7 and FIG. 8. Alternatively, there are two air gaps, and the two air gaps are respectively disposed in the first magnetic core and the second magnetic core, as shown in FIG. 2.

The air gap may be implemented by disposing a groove in the first magnetic core and/or the second magnetic core. A groove for accommodating an end portion of the third magnetic core is disposed in at least one of the first magnetic core and the second magnetic core. For example, as shown in FIG. 2, there is the first groove in the first magnetic core, and there is the second groove in the second magnetic core. For example, as shown in FIG. 7 and FIG. 8, there is the second groove only in the second magnetic core, or there is the first groove only in the first magnetic core. The groove is disposed in the first magnetic core and/or the second magnetic core, and the air gap is formed between the groove and the third magnetic core.

An insulation layer is disposed in each groove, the insulation layer is fixedly connected to the inserted end portion of the third magnetic core, and a solid air gap is formed by using the insulation layer. It may be learned from FIG. 2, FIG. 7, and FIG. 8 that when a groove is disposed in any magnetic core, an insulation layer is correspondingly disposed in the groove. For example, a first insulation layer is disposed in the first groove in the first magnetic core, and a second insulation layer is disposed in the second groove in the second magnetic core. The insulation layer is used as the air gap, to facilitate connection between magnetic cores and facilitate formation of the air gap.

When the insulation layer, the groove, and the third magnetic core are disposed, reference may be made to the related description in FIG. 3 and FIG. 4 for dimension relationships in a direction a and a direction b. If a thickness of the insulation layer is less than a depth of the corresponding groove, it may be obtained, with reference to the first magnetic core and the second magnetic core shown in FIG. 3 and FIG. 4, that a thickness of the first insulation layer is less than a depth of the first groove, and a thickness of the second insulation layer is less than a depth of the second groove.

Figure 10:
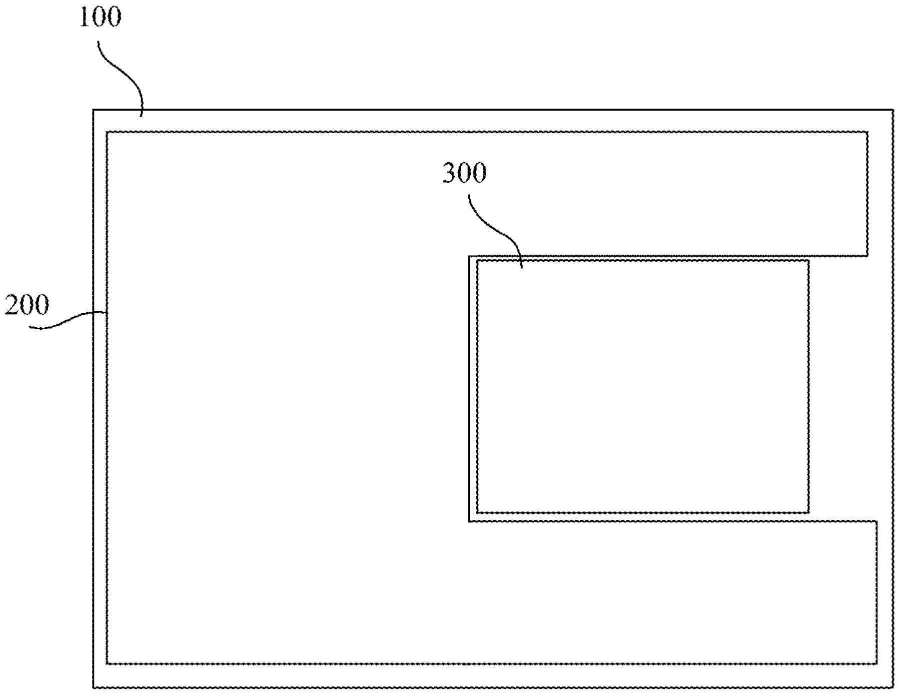
FIG. 10 is a schematic diagram of a structure of a circuit board according to an embodiment of this application.

An embodiment of this application further provides a circuit board. The circuit board may be a different circuit board, for example, a common circuit board such as a circuit board in a communications device or a circuit board in a self-driving vehicle. A high-density and high-efficiency wiring manner is usually used for the circuit board. FIG. 10 shows a circuit board. The circuit board includes a wiring layer 200 and the electrical element 300 in any one of the foregoing embodiments. A circuit of the wiring layer 200 is spaced from the electrical element 300 by a specified distance.

During specific disposing, the circuit board includes a body 100, and both the wiring layer 200 and the electrical element 300 are disposed on the body 100. The electrical element 300 may be a magnetic element such as an inductor or a transformer. Any one of the structures shown in FIG. 2, FIG. 7, and FIG. 8 may be used for the electrical element 300. When the foregoing structure is used for the electrical element 300, an air gap is disposed in a first magnetic core or a second magnetic core, and there is no air gap in a third magnetic core, and therefore there is no stray flux, and more generated magnetic induction lines are bound in the first magnetic core and the second magnetic core. In this way, occurrence of an additional cutting loss is reduced, a case in which a winding need to be avoided in high-density design is resolved, and wiring density on the circuit board is increased, so that the circuit board is applicable to a high-density and high-efficiency wiring scenario.

An embodiment of this application provides a switching power supply. The switching power supply includes a housing and the foregoing circuit board or the electrical element in any one of the foregoing embodiments that is disposed in the housing. When the foregoing circuit board is used, the structure shown in FIG. 10 may be used for the circuit board. When only the electrical element is used, the electrical element may be a magnetic element such as an inductor or a transformer. Any one of the structures shown in FIG. 2, FIG. 7, and FIG. 8 may be used for the electrical element. When the foregoing structure is used for the electrical element, an air gap is disposed in a first magnetic core or a second magnetic core, and there is no air gap in a third magnetic core, and therefore there is no stray flux, and more generated magnetic induction lines are bound in the first magnetic core and the second magnetic core. In this way, occurrence of an additional cutting loss is reduced, a case in which a winding need to be avoided in high-density design is resolved, and wiring density on the circuit board is increased, so that the circuit board is applicable to a high-density and high-efficiency wiring scenario.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. An electrical element, comprising:

a first magnetic core and a second magnetic core disposed opposite to each other, wherein the first magnetic core and the second magnetic core enclose a space for accommodating a winding; and a third magnetic core located in the space enclosed by the first magnetic core and the second magnetic core, wherein the third magnetic core is configured to wind the winding, the third magnetic core is fixedly connected to at least one of the first magnetic core or the second magnetic core, an air gap is disposed in at least one of the first magnetic core or the second magnetic core, at least one of the first magnetic core or the second magnetic core comprises a groove configured to receive a respective end portion of the third magnetic core, wherein the air gap is arranged between the groove and the respective end portion of the third magnetic core which is inserted in the groove, wherein the air gap comprises an insulation layer, and the respective end portion of the third magnetic core is fixedly connected to the groove using the insulation layer, and a thickness of the insulation layer is smaller than a gap between a side wall of the groove and a side wall of the third magnetic core.

2. The electrical element according to claim 1, wherein the insulation layer comprises at least one of an epoxy resin layer or an adhesive layer.

3. The electrical element according to claim 2, wherein the insulation layer is disposed between a bottom surface of the groove and an end face of the respective end portion of the third magnetic core inserted in the groove.

4. The electrical element according to claim 1, wherein the thickness of the insulation layer is less than a depth of the corresponding groove.

5. The electrical element according to claim 1, wherein an opening area of each groove is greater than an end face area of the corresponding inserted end portion of the third magnetic core.

6. The electrical element according to claim 5, further comprising a gap disposed between each sidewall of each groove and an opposite sidewall of the third magnetic core.

7. The electrical element according to claim 1, wherein the third magnetic core and the first magnetic core are of an integral structure; and the air gap is disposed in the second magnetic core.

8. The electrical element according to claim 7, wherein the first magnetic core and the third magnetic core form an E-shaped magnetic core; and the second magnetic core is of a plate-like structure.

9. The electrical element according to claim 1, wherein the third magnetic core comprises:

a fourth magnetic cores fixedly connected to the first magnetic core; and a fifth magnetic core fixedly connected to the second magnetic core, wherein each of the first magnetic core and the second magnetic core is a C-shaped magnetic core, and the air gap is disposed in each of the first magnetic core and the second magnetic core.

* * * * *